Figure 1:
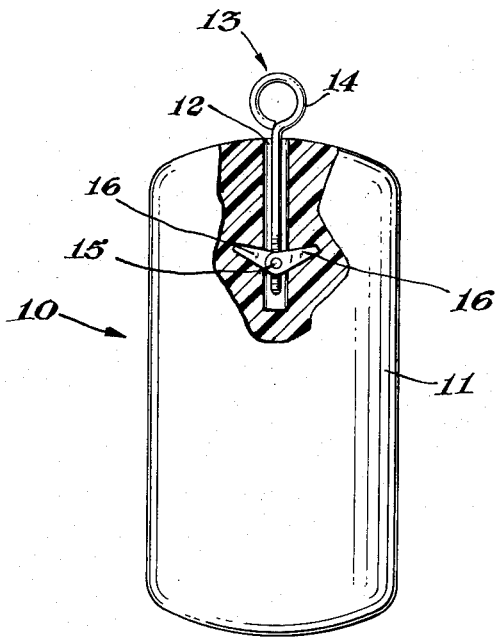

Jan. 7, 1964   L. A. LARSON   3,116,498
CONNECTIONS TO EXPANDED PLASTIC MATERIALS
Filed March 3, 1960

INVENTOR.
Leland A. Larson
BY
AGENT 3,116,498
CONNECTIONS TO EXPANDED PLASTIC
MATERIALS
Leland A. Larson, Gladwin, Mich., assignor to The Dow
Chemical Company, Midland, Mich., a corporation of
Delaware
Filed Mar. 3, 1960, Ser. No. 12,583
3 Claims. (Cl. 9—8)

This invention relates to expanded polymeric bodies having secured therein a toggle bolt assembly and a method for securing a toggle bolt assembly in foamed plastic materials.

Frequently, it is desirable to provide in a body of expanded or foamed plastic material suitable means for securing a line, restraining said bodies or otherwise affixing a rigid or flexible member thereto. Due to the low compressive strength of foamed plastic bodies, conventional fastening means, such as bolts, wood screws, lag screws, and the like, are usually unsuitable as insufficient resistance to withdrawal of the screw member or other attaching member is offered by the foamed plastic body. This difficulty has been overcome in such objects as boat bumpers, life rings, life belts, and swimming and water skiing belts by including the foamed plastic body in a fabric envelope and securing support means to the fabric envelope.

Foamed plastic float members have been prepared having surface characteristics which do not require the protection offered by a fabric envelope or case. However, securing a line or other support means to such members is relatively difficult, and, in general, this problem was approached by forming a hole through such members and passing a line therethrough. Generally, useful floats of this type require a hole sufficiently long that it cannot conveniently be formed by the usually available fabricating equipment.

Further, such floats or similar objects fabricated from expanded or foamed plastic material require auxiliary stop means to prevent the float shifting from its position on the restraining line. Frequently, when such floats are incorporated in an assembly comprising a plurality of such floats arranged in substantially end-to-end arrangement, the replacement of one float requires the disassembly of the entire unit.

It is an object of this invention to provide floats fabricated from a foamed plastic material which do not require holes formed entirely through the float.

It is a further object of the invention to provide a float having a metallic bolt firmly secured therein.

It is an additional object of the invention to provide a float which, when incorporated in an assembly by means of rope or other similar material, does not require a disassembly of the entire unit for the replacement of one float.

It is a still further object of this invention to provide an improved foamed plastic boat bumper and improved water-ski belts and the like.

It is yet another object of the invention to provide a method of securing threaded metal members to foamed plastic objects.

Figure 2:
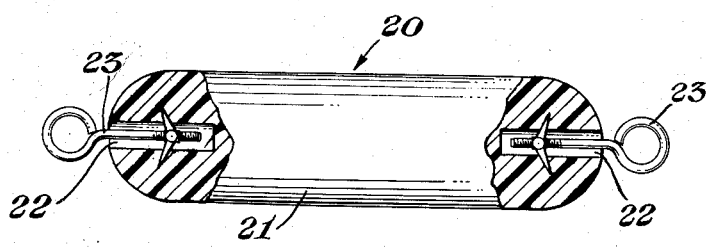

These and other objects and advantages will become more apparent from the following description in conjunction with the accompanying drawing wherein:

FIGURE 1 illustrates a partly in section schematic view of a boat bumper in accordance with the invention; and FIGURE 2 shows a partly in section schematic view of a float made in accordance with the invention suitable to be employed as a water skiing belt or fish net float.

In FIGURE 1 is illustrated a partly in section view of a boat bumper generally indicated by the reference number 10. The bumper 10 is assembled from two principal parts, (1) a foamed plastic body 11 having formed therein a cavity 12 and (2) an open toggle bolt assembly generally indicated by the reference character 13 and comprising an eye bolt 14 and a nut 15 having pivotally attached wings comprising the toggle bolt head assembly 16 making up the toggle bolt assembly 13.

FIGURE 2 depicts a partly in section view of a fishing net or skiing belt float generally indicated by the reference character 20. The float 20 comprises a foamed plastic body 21 having formed therein a plurality of cavities 22 and positioned within the cavities 22 an open toggle bolt assembly 23 similar to the toggle bolt assembly 13.

A wide variety of foamed plastics may be employed in the practice of the invention. The choice of the particular foamed plastic employed will depend on the end use intended for the product.

Such objects as fishing net floats, life rings, and the like may advantageously be prepared from foamed polystyrene or foamed polyethylene while objects such as swimming belts and boat bumpers wherein resiliency in the end product is desired may be prepared from foamed polyethylene and similar flexible and yieldable foamed plastics.

Toggle bolts 13 of the wing variety that are eminently suitable for the practice of the invention are described in U.S. Patent No. 1,228,512. Frequently, it is beneficial to modify such bolts 13 by sharpening the edge of the toggle wing 15 most remote from the nut 14.

The foamed plastic float or similar object may be prepared to receive the toggle bolt assembly 13 by forming a hole or cavity sufficiently deep and of sufficient diameter to permit entry of the toggle bolt head assembly 16 into the hole when the wings 15 are in closed position. The toggle bolt 13 may then be positioned within the cavity of the body and the wings expanded.

Cavities may be formed within the plastic bodies by a variety of methods such as drilling, punching, boring, hot-wire cutting, and the like. Usually it is advantageous, more particularly where a relatively small number of objects are to be prepared, to drill or punch the cavities. Drilling or punching leaves a relatively rough wall on the interior of the cavity which will readily engage the external edge of the toggle bolt wing 15 to permit expansion of the wings 15 into their usual position generally normal to the axis of the bolt. Once the bolt 13 has been inserted into the cavity within the foamed plastic body it usually may be expanded by a partial withdrawal of the bolt which causes the wings 15 to be forced through the walls of the cavity and into the foamed plastic body.

The size of the cavity required in a soft foamed plastic body to permit insertion of a spring-wing toggle bolt such as is described in United States Letters Patent Number 1,228,512 is substantially less than the nominal hole size required when such toggle boots are employed with rigid sheet material. Commercially available ¼ inch (referring to the size of the bolt) spring-wing toggle bolt assemblies nominally require a ⅝ inch diameter hole to pass the toggle head assembly in the closed position. In foamed plastics such as foamed polyethylene a ⅜ inch diameter hole is well suited to accept a ¼ inch toggle head assembly. As successively more rigid foamed plastics are employed the cavity diameter may advantageously be increased for ease of insertion until a free fit of the toggle head assembly 16 in the closed position is reached.

If plastic foams of relatively high resistance to the penetration of the toggle bolt wings 15 are employed, it is frequently advantageous to assist the expansion of the toggle bolt wings 15 by forcing them away from the body of bolt 13 by mechanical means such as a rod inserted into the cavity parallel to the bolt. Alternately, a section of tubing which may be arranged substantially coaxial with the body of the bolt 15 and employed to exert outward pressure on the bolt wings as the body of the bolt is partially withdrawn from the cavity to force the toggle wings in the foamed plastic body.

By way of further illustration, a boat bumper was prepared by first drilling a 3-inch deep, ⅜ inch hole axially in one end of the foamed polyethylene body about 4 inches in diameter and about 12 inches long. A ¼ inch by 4 inch eye bolt with the ¼ inch toggle nut was assembled in the usual manner and the toggle head assembly inserted into the ⅜ inch hole in the plastic body. Force was applied rapidly to the eye bolt in a direction which tended to withdraw it from the foamed polyethylene body which resulted in the expansion of the wings of the toggle bolt and prevented withdrawal of the bolt from the foamed polyethylene body. This arrangement was found to provide an eminently suitable boat bumper which was employed for one boating season and no tendency was observed for the bolt to be released from the expanded plastic material.

In a manner similar to that described, float belts were fabricated for use by water skiers and were found to be comfortable and gave excellent service. Repeated falls from water skis at high speeds and wearing of the belt did not appear to weaken or loosen the grip of the toggle bolt within the foamed plastic floats.

Conventional toggle bolt assemblies have been mounted in foamed polystyrene bodies by the method of the invention and have provided an eminently satisfactory anchoring means.

Certain changes and modifications in the practice of the present invention can be readily entered into without substantially departing from its intended spirit and scope. Therefore, it is to be fully understood that the invention is not to be considered as being limited or in any way restricted to or by the preferred diadactic embodiments thereof which are set forth in the foregoing description and specification. Rather, it is to be interpreted and construed liberally in the light of what is set forth and defined in the hereto appended claims.

What is claimed is:

1. A combination of a foamed plastic body and at least one toggle bolt assembly, said body defining at least one cavity of suitable dimensions to accept the toggle head assembly of said toggle bolt assembly in the closed position; said toggle head assembly of said toggle bolt assembly positioned within said cavity and the toggle head wings extended generally normal to the axis of the bolt carrying said toggle head assembly.

2. A float member comprising a foamed plastic body and a pair of toggle bolt assemblies; said body defining two generally axially opposed cavities, each cavity of suitable dimension to accept the toggle head assembly of said toggle bolt assemblies in the closed position; each of said toggle head assemblies of said toggle bolt assemblies positioned within one of said cavities and said toggle head assembly wings extended generally normal to the axis of the bolt carrying said toggle head assembly.

3. A cushioning member comprising a foamed plastic body and a toggle bolt assembly of the wing variety, said body defining one cavity of suitable dimensions to accept the toggle head of said toggle bolt assembly in the closed position, said toggle head of said toggle bolt assembly positioned within said cavity and said toggle head wings extended generally normal to the axis of said bolt carrying said toggle head.

References Cited in the file of this patent

UNITED STATES PATENTS

| | | |
|---|---|---|
| 950,685 | White | Mar. 1, 1910 |
| 1,396,279 | Paine et al. | Nov. 8, 1921 |
| 1,605,102 | Dryden | Nov. 2, 1926 |
| 1,982,963 | Post | Dec. 4, 1934 |
| 2,519,511 | Stelter | Aug. 22, 1950 |
| 2,935,751 | Emmick et al. | May 10, 1960 |
| 2,960,055 | Tomek | Nov. 15, 1960 |